United States Patent

Brody et al.

[15] 3,645,627
[45] Feb. 29, 1972

[54] CALIBRATION SYSTEM FOR PHOTODETECTING INSTRUMENTS

[72] Inventors: Samuel S. Brody, Springfield; William B. Holland, Vienna, both of Va.

[73] Assignee: Melpar Inc., Falls Church, Va.

[22] Filed: Apr. 14, 1969

[21] Appl. No.: 815,711

[52] U.S. Cl. ............................................. 356/87, 356/187
[51] Int. Cl. .......................................... G01j 3/30, G01j 3/48
[58] Field of Search ........................................... 356/87, 187

[56] References Cited

UNITED STATES PATENTS

| 3,198,062 | 8/1965 | Chaffee | 356/187 |
| 3,460,892 | 8/1969 | Dolin | 356/187 |
| 3,489,498 | 1/1970 | Brody et al. | 356/187 |

OTHER PUBLICATIONS

" Absolute Sensitometric Measurements Using a Fast, High–Dispersion Objective Spectrograph" Wiebe & Courville; Photographic Science & Engineering; Vol. 8 No. 5; Sept.–Oct. 1964; pg. 293–295

Primary Examiner—Ronald L. Wibert
Assistant Examiner—V. P. McGraw
Attorney—Hurvitz, Rose and Greene

[57] ABSTRACT

A photometric emission detector is provided with an integral calibration source including a source of light and apparatus for controlling the passage of light and the quantity of light passed along the optical path via which induced radiant energy emissions are detected when the detector is in use.

11 Claims, 3 Drawing Figures

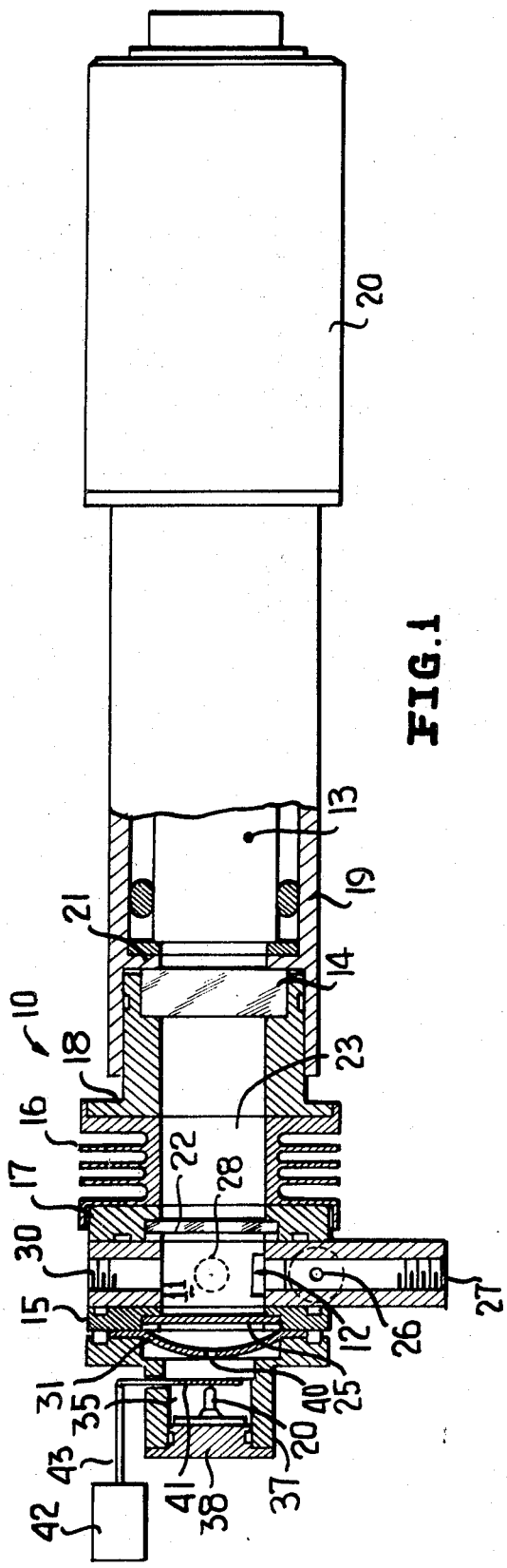
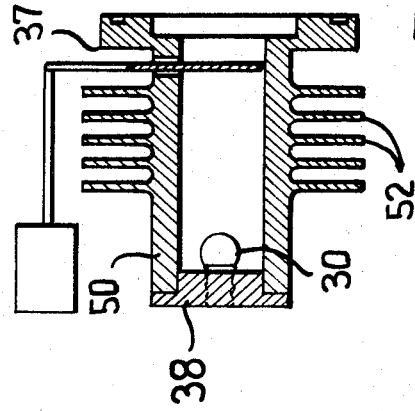
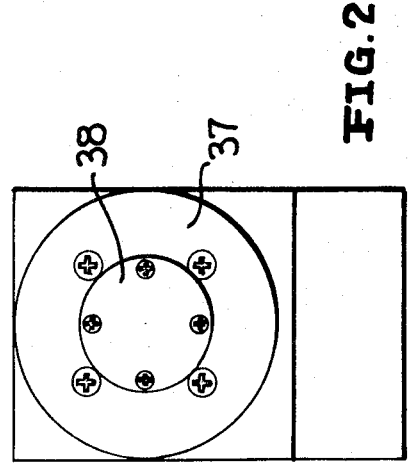
INVENTORS
SAMUEL S. BRODY
& WILLIAM B. HOLLAND
BY Hurwitz, Rose & Greene
ATTORNEYS 3,645,627

CALIBRATION SYSTEM FOR PHOTODETECTING INSTRUMENTS

BACKGROUND OF THE INVENTION

Our invention is within the field of photometry, dealing specifically with calibration of instruments relying on photometric emission and detection, such as flame photometers and spectrophotometers, and fluorescence and phosphorescence spectrophotometers and photometers.

In calibrating such instruments in the past, it has been standard practice to use one of three general methods, namely, (1) to calibrate the photometric portion of the detector in a location separate from the overall system, using a suitable light source, (2) to calibrate the photometric portion while in its usual system location by optically alternating the emissions (signal) to be detected with an outside-the-system reference light source, or (3) to calibrate the detector by means of a reference chemical input thereto. Each of these prior art methods, while suitable for its intended purpose, has had its limitations. For example, all three require substantial setup time by skilled operator in order to ensure accuracy of calibration. In addition to that major drawback, method (1) is difficult to implement and perform merely because of the type of source involved; method (2) is less accurate than the others because it fails to take into account certain factors peculiar to the location of the photometric detector portion within the actual system, and method (3), the most commonly used technique, does not admit of isolation of the photometer from the emission (calibration)source.

SUMMARY OF THE INVENTION

The principal object of our invention is to provide a calibrated source of light integrated into the photometric emission and detection system.

In the copending application Ser. No. 506,543 of Samuel S. Brody et al., entitled "Flame Photometric Detector With Improved Specificity to Sulfur and Phosphorus," filed Nov. 5, 1965, now U.S. Pat. No. 3,489,498, and of common assignee, there is disclosed instrumentation in which gas analysis is performed using flame photometry. Briefly, according to that invention a sample of the gas to be analyzed is burned in a hydrogen rich flame in which combustion is supported by air, and observable flame-induced emissions from materials in the sample are restricted to substantially only those wavelengths of radiant energy emanating from a region above the cone of the flame. Wavelengths characteristics of flame emissions from sulfur compounds or phosphorus compounds, or both, are then selectively detected, principally only for those emissions from the region above the cone of the flame. For the sake of convenience and simplicity in the ensuing description of the preferred embodiment, the present invention will be described in terms of its use in the instrumentation set forth in the aforementioned copending Brody et al. application, but is not restricted to use in that specific type of apparatus. Rather, as will be apparent from the detailed description to follow, the concepts and principles of our invention are equally applicable to the wide range of photometric and spectrophotometric instruments previously noted.

Briefly, according to one form of the present invention, and consistent with the object set forth earlier, the light source consists of a phosphor which emits upon bombardment from a radioactive source. The light source is positioned behind a manually or electromechanically actuated shutter, within the confines of the instrument container or case, and is aligned to emit light along the same optical path as that traveled by the emissions produced by the instrument to be calibrated. Upon opening of the shutter, the photometric detector of the instrument is exposed to light emitted by the phosphor, preferably through an aperture, and through a suitable filter. This effectively supplies a known quantity of light as an input to the photometric detector, for calibration purposes.

In another form of the invention, an incandescent lamp is utilized as the light source, and temperature isolation techniques are then used to ensure that the light source is operated at a nominal or ambient temperature of a laboratory environment. Preferably, removal of heat prior to entry into the region in which the lamp is located is accomplished by positioning the lamp at the end of a relatively long tube having heat-dissipating fins. The source is driven by a regulated power supply to provide a known quantity of light to the photometric detector for calibration.

In addition to the convenience of having the calibrated light source within the body of the instrument, which itself permits frequent calibration without time-consuming and costly breaking-down and setting-up of the instrument, the structural configuration is simple and inexpensive as compared with that of the apparatus required for the prior art calibration methods, and the calibration (reference) light passes along the same or substantially the same optical path as does the light emitted by the flame, prior to incidence on the photodetector. The latter factor assures that light from each source, i.e., from reference and from flame, will suffer the same attenuation attributable to the same causes, and hence, that calibration of the instrument provides greater accuracy than that enjoyed heretofore.

BRIEF DESCRIPTION OF THE DRAWINGS

Our invention will be better understood by reference to the accompanying drawings illustrating two exemplary forms or implementation of the calibration apparatus within a photometric emission and detection instrument.

FIG. 1 is a partial section view of the instrument with a first embodiment of the calibration apparatus, showing only so much of the interior of the instrument's structure as is required for an understanding of the invention;

FIG. 2 is an end view of the instrument of FIG. 1; and

FIG. 3 is a fragmentary section view similar to that of FIG. 1, showing a second embodiment of the invention.

DESCRIPTION OF THE PREFERRED EMBODIMENTS

Referring to FIG. 1, the emission detecting instrument generally designated by reference numeral 10 is a flame photometric detector of the type disclosed in the aforementioned Brody et al. application Ser. No. 506,543, now U.S. Pat. No. 3,489,498, to which reference may be had for details beyond those essential to an understanding of our present invention. In any event, the concepts of the invention are applicable to a wide range of photometric and spectrophotometric instruments, as previously noted.

The instrument package includes a cavity 11 into which a burner tip 12 projects to provide a flame (not shown) whose cone may be shielded by a shield extending above tip 12, such that only the region of the flame above the cone is observable. Emissions within that region attributable to components or materials whose presence in the sample being burned is to be determined are detected by incidence of radiant energy at the wavelength or wavelengths associated with flame emission from those materials on a photomultiplier tube 13, after passage through an optical filter 14 selective with respect to that wavelength.

The cavity is defined by the detector housing 15 composed of any suitable heat-resistant material, and the filter 14 and photomultiplier tube 13 are positioned a sufficient distance from the burner cavity and are composed of appropriate materials to withstand the heat present at their specific locations when the instrument is in use. Additional heat dissipation is provided by a heat sink 16 including a finned region interposed between two Teflon heat barriers 17, 18. Teflon heat barrier 18 telescopes into a cylindrical shell 19 about photomultiplier tube 13 and leading to the remaining electronic detecting package 20. Barrier 18 seats against one side and tube 13 against the other side of an internal flange or wall 21 in shell 19, and optical filter 14 is retained between an undercut portion of barrier 18 and the barrier side of wall 21. A Pyrex window 22 defines the right-hand end (as viewed in FIG. 1) of cavity 11, permitting passage of virtually all wavelengths contained in emissions from the flame in the cavity via optical passageway 23. The other end (left-hand end, as viewed in FIG. 1) of cavity 11 is also defined by a Pyrex window, designated by reference numeral 25.

Burner tip 12 is fed with fuel gas, such as hydrogen, via an inlet 26, the fuel gas not being intermixed with the combustion-supporting gas, such as air, until the gases exit the burner tip. The air is introduced through inlet 27. The air acts also as a carrier for the gas or other substance under investigation. The gases supplied to the burner tip are ignited via an ignition port closed by a plug 28, and the products of combustion are exhausted through an exhaust port 30.

In operation of the apparatus thus far described, a sample of the gas to be analyzed is introduced into the combination-supporting carrier gas and is burned in a hydrogen rich flame at the burner tip. By proper use of shielding, as discussed in the aforementioned Brody et al. application, observable flame-induced emissions from materials in the sample are restricted to substantially only those wavelengths emitted from the region above the cone of the flame. If desired, a focusing or collimating mirror 31 may be positioned at the rear (relative to the specific detector apparatus) of cavity 11 to reflect emissions incident thereon toward and along optical passageway 23 together with emissions initially directed along the passageway. Wavelengths characteristic of flame emissions from materials under investigation are then detected, if present, by the photomultiplier tube and following electronics.

Housed within a further chamber 35 removed from direct exposure to flame and heat generated in burner cavity 11 are components of the calibration source generally designated by reference numeral 20. Chamber 35 is defined by a stepped cylindrical wall 37 fastened to the rear portion of the cavity housing, and a cover plate 38 that closes the chamber. The entire unit is constructed to avoid contamination of the burner cavity by elements of compounds which are not a part of the sample under investigation or one of the combustion inducing or fuel gases (e.g., air and hydrogen, respectively).

In the embodiment shown in FIG. 1, the calibration source 20 includes a light emitting portion which may produce monochromatic light or may produce light covering a broad portion of the spectrum, including a source of substantially white light, if desired. A phosphor that emits light in response to activation by an appropriate source is preferable because it is self-powered and provides a relatively constant light intensity or output. A well-known commercially available phosphor light source utilizes $\beta_-$ emission from radioactive krypton to activate the phosphor. The light emitting source may be supported in any convenient manner, as by mounting on cover plate 38, this not being critical to the invention, except that it is positioned relative to an aperture 40 to emit light along the optical path of the photodetection portion of the system. When the instrument is to be calibrated, during a period of nonuse for analysis, an electromechanical shutter is actuated, the shutter including a normally light-blocking segment 41 interposed between source 20 and aperture 40, an actuator 42 and a connecting shaft 43. Upon actuation of the shutter to its calibration position, light emitted from the phosphor travels along the optical path and is incident on the photomultiplier tube (after passage through filter 14). Since the optical path is substantially the same as that of flame-induced emissions, it follows that the reference or calibration light is subjected to attenuation from the same factors that act upon the signal, i.e., the flame emissions at the wavelengths under consideration. The time interval for opening of the shutter is not critical to the calibration operation. During calibration, light from source 20 of wavelength(s) passed by filter 14 is detected using PM tube 13 and the detector electronics and since the reference light constitutes a known quantity of light, it serves to provide a datum level against which the flame induced emissions may be compared during analysis. For calibration of the instrument the detector portion of the system may be the same as that shown in the aforementioned Brody et al. application.

It should be observed that the shutter may be manually rather than electromechanically operated, and that a neutral density filter or transparent window may be used in place of aperture 40 (dispensing with noncritical mirror 31).

In the embodiment of FIG. 3, all components of the instrument are the same, but the calibration source includes a conventional incandescent lamp or other light emitting device 30 requiring power from an external source. Such a light source may be placed at the end of a tube 50 having cooling fins 52 to dissipate heat generated from the cavity 11 during operation of the flame photometric detector. The length of tube 50 depends upon the number and size of the cooling fins fastened thereto, these components being preferably composed of aluminum. When source 30 is energized by a regulated power supply (not shown), a known (predetermined) reference light intensity is incident on the photometric detector for calibration. The light bulb may be received in a conventional light socket at the end of tube 50, and is positioned relative to aperture 40 to subject photomultiplier tube 13 to light along the optical path of the signal, as in the preceding embodiment.

It is to be observed that the light source may be incandescent, phosphorescent, fluorescent, electroluminescent, or may operate to produce light on the basis of other known phenomena.

We claim:

1. In an instrument for optical detection of induced radiant energy emissions occurring along a preselected optical path, and including a housing containing means positioned along said optical path for detecting selected wavelengths of the emitted radiant energy, said means including a photodetector; the improvement comprising a calibration source of reference light integral with said instrument and fastened to said housing to emit a known quantity of light along the entirety or said optical path, said calibration source including a light source, means for controlling the emission of light from said light source, and means for selectively passing light emitted from said light source along said optical path for incidence on said photodetector to permit calibration of said instrument, said calibration source positioned at a point in said instrument to prevent obstruction thereby of said induced emissions relative to said photodetector.

2. The invention according to claim 1 wherein said instrument is a flame photometric detector in which the flame is aligned with and between said calibration source and said photodetector when said instrument is in use.

3. The invention according to claim 2 wherein said light source is incandescent, and wherein is further provided means for maintaining a relatively low-temperature environment about said light source during operation of said flame photometric detector in comparison with temperatures in the vicinity of said flame.

4. The invention according to claim 1 wherein said means for selectively passing light comprises a shutter interposed between said light source and said photodetector in said optical path.

5. The invention according to claim 1 wherein said light source comprises a phosphor activated by radioactive particles.

6. The invention according to claim 2 wherein said flame photometric detector comprises a cavity, a burner tip projecting into said cavity, means for feeding combustion-supporting gas carrying a substance to be analyzed to said burner tip, means for mixing said combustion-supporting gas with fuel gas in said burner tip to support ignition of a flame from said burner tip within said cavity, said photodetector positioned relative to said cavity for viewing along a path generally perpendicular to the axis of said flame; a chamber located on the opposite side of said cavity relative to said photodetector, said light source mounted in said chamber for emitting light along said optical path, said selective passing means comprising an actuable shutter for passing or blocking light emitted from said source along said optical path prior to entry into said cavity.

7. A device for optically detecting radiant energy of preselected wavelengths emitted from a substance under investigation along an optical path, comprising
    a housing,
    a chamber within said housing for inducing emission of radiant energy from said substance,
    photodetecting means in said housing positioned relative to said chamber to detect radiant energy at said preselected wavelengths emitted from said substance along said optical path,
    a reference light source for calibrating said photodetecting means mounted within said housing outside said chamber, and
    means for selectively directing light emitted from said reference source through said chamber and along said optical path.

8. The device according to claim 7 wherein said reference source is a self-powered source of light to permit complete containment within said housing.

9. The device according to claim 8 wherein said reference source comprises a phosphor activated by bombardment from a radioactive source.

10. The device according to claim 7 including a further chamber disposed co-linear with said first-named chamber and said photodetecting means and on the opposite side of the first-named chamber from said photodetecting means along said optical path, said reference source mounted in said further chamber for emitting light of known intensity along said optical path via said first-named chamber for incidence on said photodetecting means, said selective directing means including means for opening or closing the optical path between said further chamber and said first-named chamber.

11. In a flame photometric detector system for optical detection of radiant energy emissions induced from a flame and occurring along a preselected optical path, and including a housing containing means positioned along said optical path for detecting selected wavelengths of the emitted radiant energy, said means including a photodetector; the improvement comprising:
    a calibration source of reference light integral with said detector system and fastened to said housing to emit a known quantity of light along said optical path, said calibration source including a light source, and means for restricting a known quantity of light emitted from said light source to said optical path for incidence on said photodetector to permit calibration of said detector system;
    said calibration source positioned at a point in said detector system on the opposite side of said flame from said photodetector to prevent obstruction thereby of said induced emissions relative to said photodetector.

* * * * *